United States Patent
Stumer et al.

(10) Patent No.: US 6,587,546 B2
(45) Date of Patent: Jul. 1, 2003

(54) METHODS AND APPARATUS FOR DIALING AN EMERGENCY TELEPHONE NUMBER FROM A TELEWORKING CLIENT REMOTELY COUPLED TO A PBX

(75) Inventors: Peggy M. Stumer, Boca Raton, FL (US); Nissim Ozery, Parkland, FL (US); David J. Swartz, Plantation, FL (US); David A. Vander Meiden, Boca Raton, FL (US); Charles Goodman, Nipomo, CA (US); Joseph Budziak, Boca Raton, FL (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/815,685

(22) Filed: Mar. 23, 2001

(65) Prior Publication Data

US 2002/0136359 A1 Sep. 26, 2002

(51) Int. Cl.⁷ ............................................... H04M 11/00
(52) U.S. Cl. ........................................... 379/37; 379/40
(58) Field of Search ............................ 379/37–51, 234, 379/198, 93.09

(56) References Cited

U.S. PATENT DOCUMENTS

| | | | |
|---|---|---|---|
| 4,924,491 A | 5/1990 | Compton et al. ............... 379/37 |
| 5,161,180 A | * 11/1992 | Chavous ......................... 379/45 |
| 5,339,351 A | 8/1994 | Hoskinson et al. ............. 379/45 |
| 5,347,567 A | 9/1994 | Moody et al. .................. 379/45 |
| 5,347,568 A | 9/1994 | Moody et al. .................. 379/45 |
| 5,771,283 A | 6/1998 | Chang et al. ................. 379/142 |
| 5,864,755 A | 1/1999 | King et al. ................... 455/404 |
| 6,028,915 A | * 2/2000 | McNevin ........................ 379/49 |
| 6,243,442 B1 | 6/2001 | Tanaka et al. ................. 379/45 |
| 6,266,397 B1 | 7/2001 | Stoner .......................... 379/45 |
| 6,289,083 B1 | 9/2001 | Ray ............................. 379/49 |
| 6,301,483 B1 | 10/2001 | Israelsson .................... 455/462 |
| 6,370,232 B1 | 4/2002 | Yrjana ......................... 379/37 |

FOREIGN PATENT DOCUMENTS

| | | |
|---|---|---|
| EP | 0 700 222 A | 3/1996 |
| EP | 1 009 177 A2 | 6/2000 |
| GB | 2 320 849 A | 7/1998 |
| GB | 2 349 774 A | 11/2000 |
| JP | 402216992 A | 8/1990 |
| JP | 07336433 A | 12/1995 |
| JP | 408307438 A | 11/1996 |
| JP | 10051553 A | 2/1998 |
| JP | 10210171 A | 8/1998 |
| JP | 11275263 A | 10/1999 |
| WO | WO 00 7393 A | 2/2000 |

OTHER PUBLICATIONS

Cisco Systems Contribution to Assist TR–41 Standards Committee entitled "Enterprise Network–Based Solution For Locating 911 Caller Using an IP Phone"; dated Feb. 2001, pp. 1–4; Document No. TR–41.4/01–02–069.

"NENA Technical Information Document on Model Legislation Enhanced 9–1–1 for Multi–Line Telephone Systems", Nov. 2000, pp. 1–15.

* cited by examiner

Primary Examiner—Stella Woo

(57) ABSTRACT

Methods for dialing an emergency telephone number from a teleworking client according to the invention include detecting at the teleworking client when an emergency number is dialed, disconnecting the teleworking client from the PBX/MLTS, connecting the teleworking client to the PSTN, and dialing an associated stored number. The apparatus of the invention resides in software that is installed in off the shelf hardware. Though the invention is described with reference to a teleworking client, it may also be applied to any other dialup network connection.

31 Claims, 4 Drawing Sheets

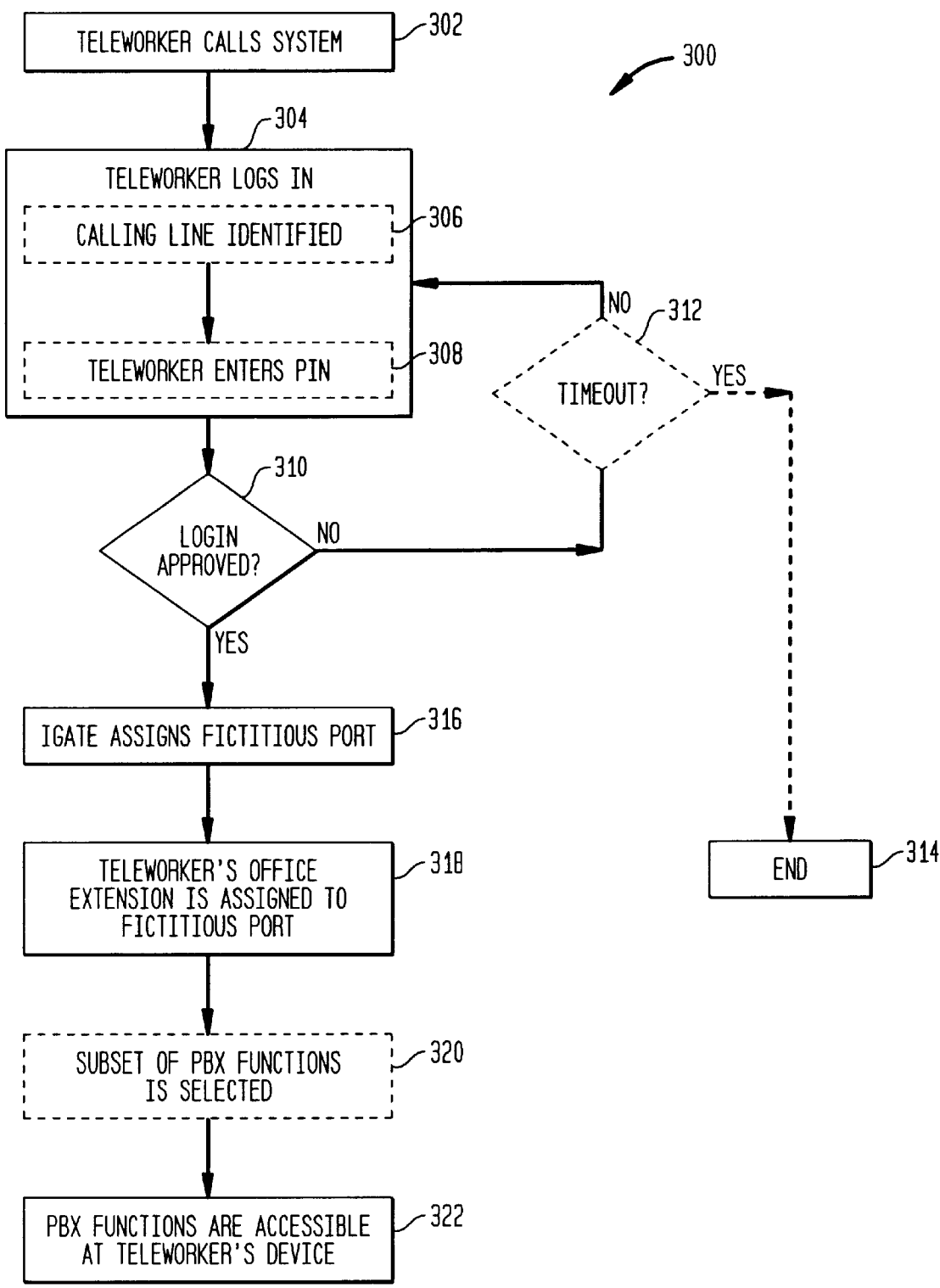

METHODS AND APPARATUS FOR DIALING AN EMERGENCY TELEPHONE NUMBER FROM A TELEWORKING CLIENT REMOTELY COUPLED TO A PBX

This application is related to co-owned co-pending application Ser. No. 09/710,037 filed Nov. 8, 2000, entitled "Method and Apparatus for Extending PBX Features via the Public Network", the complete disclosure of which is hereby incorporated herein by reference.

This application is further related to co-owned co-pending application Ser. No. 09/816,627, filed Mar. 23, 2001, entitled "Priority Based Methods and Apparatus For Transmitting Accurate Emergency Location Identification Numbers (ELINs) From Behind A Multiline Telephone System (MLTS)"; co-owned co-pending application Ser. No. 09/816,843, filed Mar. 23, 2001, entitled "Methods And Apparatus For Transmitting Accurate Emergency Location Identification Numbers (ELINs) From Behind A Multiline Telephone System (MLTS) Utilizing Port Equipment Numbers"; co-owned co-pending application Ser. No. 09/816,823, filed Mar. 23, 2001, entitled "Methods And Apparatus For Transmitting Accurate Emergency Location Identification Numbers (ELINs) From Behind A Multi-Line Telephone System (MLTS) After An Emergency Caller Disconnects"; co-owned co-pending application Ser. No. 09/816,838, filed Mar. 23, 2001, entitled "Methods And Apparatus For Transmitting Accurate Emergency Location Identification Numbers (ELINs) After An Emergency Caller Disconnects"; and co-owned co-pending application Ser. No. 09/815,468, filed Mar. 23, 2001, entitled "System For Dialing An Emergency Telephone Number From A Teleworking Client Remotely Coupled To A PBX", the complete disclosures of which are hereby incorporated by reference.

BACKGROUND OF THE INVENTION

1. Field of the Invention

The invention relates to methods and apparatus for dialing an emergency telephone number from a teleworking client remotely coupled to a PBX. More particularly, the invention relates to methods and apparatus for intercepting dialed digits (e.g., TAPI messages, DTMF tones) dialed by the teleworking client, uncoupling the teleworking client from the PBX, coupling the teleworking client to the PSTN, and transmitting the digits as DTMF tones over the PSTN.

2. Brief Description of the Prior Art

People can access a wide variety of services and functions through telecommunications systems. A subscriber can receive, send, and forward voice messages, faxes, e-mail, and data, and can remotely manage many business and personal functions.

This new technology has important implications for teleworking. In teleworking, a teleworker performs work functions from a remote location. In many cases, a teleworker can perform functions identical to those performed by her colleague in the office. Teleworking can be loosely defined as workers performing work functions remotely through a telecommunications system.

Teleworking offers workers unprecedented flexibility and convenience for workers. It also provides opportunities for people who have traditionally been excluded from the work force or who have been able to participate on a limited basis only. It can remove geographical barriers, better integrate the disabled into the work force, and provide retraining and rehabilitation programs for the institutionalized.

Most advanced features are implemented and controlled through a control channel, which requires the user to have a telephone system, typically ISDN, that provides a separate channel for the control signal. Unfortunately, many subscribers do not have ISDN telephones or ISDN lines. ISDN telephones and lines are particularly rare in private homes, locations where teleworking can make the biggest difference. What is needed is a better way to integrate ordinary subscribers into teleworking.

The above referenced previously incorporated application entiled "Method and Apparatus for Extending PBX Features via the Public Network", discloses a system and method for allowing clients with a variety of teleworking devices, including digital and/or non-specialized dual-tone multi frequency (DTMF) telephones, to invoke PBX (private branch exchange) features. The user can invoke all or, alternatively, major PBX functions from any location.

In a preferred embodiment of the application referenced in the previous paragraph, a mobility circuit board system (IGate, SMPLX, WAML) includes a set of ports, called (herein) fictitious ports, that are not dedicated to fixed branch extensions. A fictitious port on a mobility board is assigned to a teleworker. The circuit board is responsible for enabling a teleworker at a remote phone to be treated by the switch as if he were connected to a standard physical port of the switch. When a teleworker logs in, he is assigned a fictitious port, which supports access to PBX functions.

After logging in, the teleworker can input digits to access PBX features (via feature code) or digits to call an inside or outside party via routing through the PBX. The digits are sent to the teleworking server (TW server, TWS). If a feature code is recognized by the server, the digits are suppressed from reaching the other party, and the teleworking server invokes the requested feature and sends the proper signals to the switch. The system thus provides the teleworker PBX functions at any location. In alternatives, an interactive voice recognition (IVR) system with prompts can be used to signal selection of PBX features.

Among other features, the system and method also provide for identification and call-back to avoid toll charges; activation and deactivation of call redirection; entering new call redirection destinations; identification of call redirection phone numbers; receiving and making both business and personal calls; activation and deactivation of voicemail and fax mail notifications; locating the teleworker; and dialing into specific numbers that activate and/or deactivate teleworking features without requiring user input and without requiring the call to be answered.

A method 300 for logging in is illustrated in FIG. 4. At step 302, the teleworking client calls the system. (In alternatives, the system places a call to the teleworking client.) At step 304, the teleworking client logs in, including an optional sub-step 306, at which the calling line is identified, and an optional sub-step 308, at which the teleworking client enters a PIN. Neither step, either step, or both steps can be implemented as part of login. Furthermore, other identifiers such as voice recognition can be added or used as alternatives.

At step 310, the teleworking server (TWS) checks the login. If,the login is not approved, the method loops back to step 304. As indicated by optional step 312, the number of attempts can be regulated by an attempt counter or a timeout timer. If the process times out, the method ends, at a step 314.

If the login is approved, the method continues to step 316, and the IGate assigns a fictitious port to the user. At a step 318, the TWS assigns the teleworking client's office extension to the fictitious port. An optional step 320 makes a subset of PBX features available to the fictitious port; alternatively, the full set of features is available. At a step 322, the PBX features can be accessed at the teleworking client's remote site, the site from which the original call was placed.

One unusual problem arises when a teleworking client is coupled to a remote PBX/MLTS (multiline telephone system) and the teleworking client calls an emergency telephone number. In the U.S., the number 911 is designated as an emergency number through which police, fire, and medical emergencies may be reported.

Normally, when a caller dials 911, the call is directed to a public safety answering point (PSAP) with a Caller ID (i.e., a subscriber line e.g., analog, BRI or Calling Party Number (CPN/ANI) (i.e., PRI or CAMA trunk). When the Caller ID is on a device behind a PBX/MLTS, an emergency location identification number (ELIN as defined by the National Emergency Number Association), in addition to the caller ID, is currently required by some legislative bodies to be transmitted from the caller's PBX/MLTS to the central office and the PSAP. The ELIN represents (i.e., indicates a 10-digit NANP number) the location of the caller, e.g. street address.

When a teleworking client calls 911, the call is handled by the PBX/MLTS as if the caller were located at the same location as the PBX/MLTS. Thus, incorrect ELIN and caller ID information are transmitted to the PSAP. Moreover, the call may not even be directed to the correct PSAP as the teleworking client and the PBX/MLTS may be located in different PSAP jurisdictions e.g., cities or even different states.

SUMMARY OF THE INVENTION

It is therefore an object of the invention to provide methods and apparatus for dialing an emergency telephone number from a teleworking client.

It is also an object of the invention to provide methods and apparatus for intercepting "emergency" digits dialed by the teleworking client, uncoupling the teleworking client from the PBX/MLTS, coupling the teleworking client to the PSTN, and transmitting the emergency digits over the PSTN.

It is another object of the invention to provide methods and apparatus for maintaining a database of emergency numbers to be intercepted.

In accord with these objects which will be discussed in detail below, the methods according to the invention include detecting at the teleworking client when an emergency number is dialed, disconnecting the teleworking client from the PBX/MLTS, connecting the teleworking client to the PSTN, and dialing a stored number associated with that number which was dialed. The apparatus of the invention resides in software that is installed in off the shelf hardware. Though the invention is described with reference to a teleworking client, it may also be applied to any other dialup network connection. The emergency digits (dialed and subsequently signalled to the PSTN) are not limited to emergency numbers, but are determined by the TW client via administration.

BRIEF DESCRIPTION OF THE DRAWINGS

FIG. 4 is a simplified flow chart illustrating co-owned related technology.

DETAILED DESCRIPTION

Figure 1:
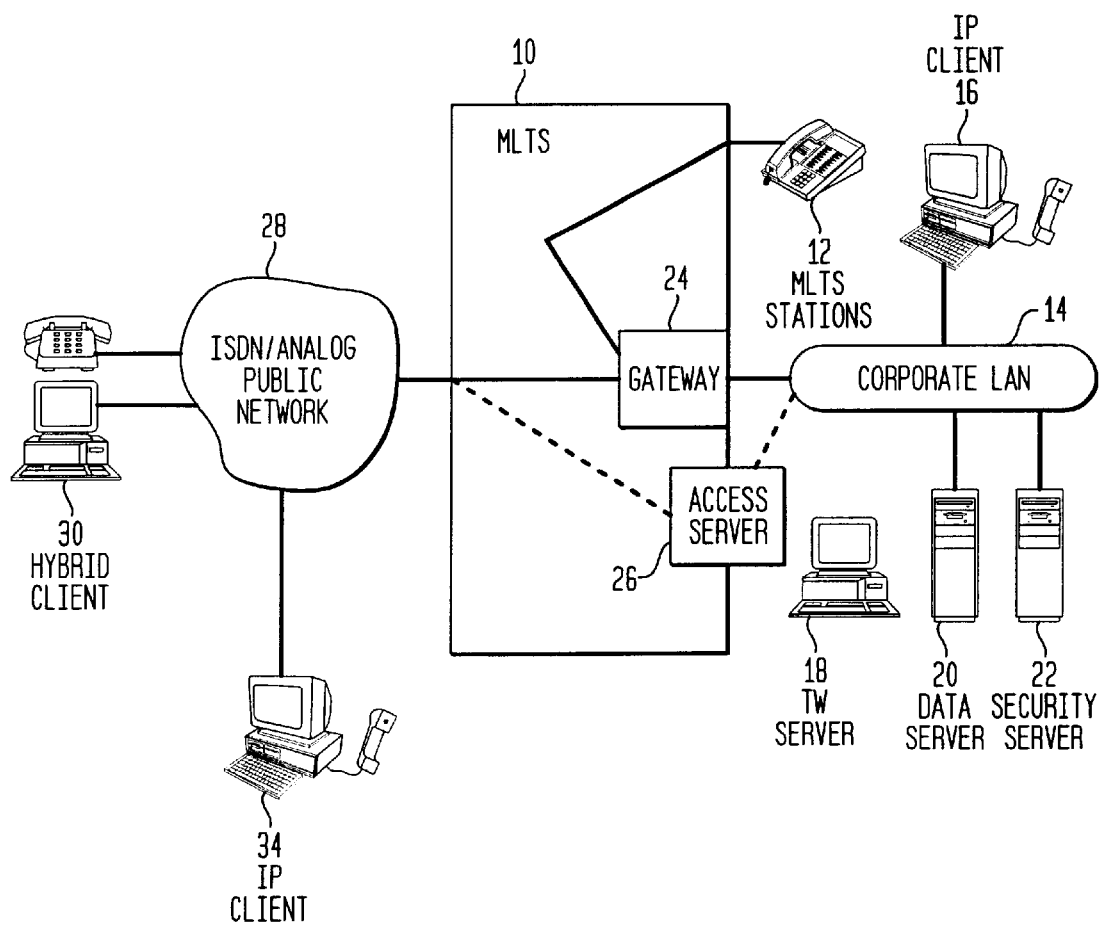
FIG. 1 is a high level schematic diagram of a system according to the invention.

Turning now to FIG. 1, a system according to the invention includes a PBX/MLTS 10 coupled to local phone sets 12 and a local area network (LAN) 14 servicing multimedia PCs 16, a teleworking server 18, a data server 20, and a security server 22. The PBX/MLTS 10 is coupled to the PSTN (public switched telephone network) 28 via a gateway 24 and an access server 26.

According to the system of the invention, remote teleworking clients 30, 34 access the PBX/MLTS 10 and the LAN 14 via the PSTN 28. Teleworking clients may include separate telephones 30 and PCs (hybrid clients) or may include a multimedia IP client 34. According to the invention specialized software, described below with reference to FIGS. 2 and 3, supports the teleworking client.

According to the invention, a hybrid client 30, 32 uses two links to the PBX/MLTS 10: one for voice information and one for multiplexed data and signaling information. The two links could be provided by an ISDN basic rate interface (BRI) or two analog dialup connections or any means of data connectivity (e.g., T3, T1, DSL, cable modem). Depending on the different link types the following clients can be differentiated.

A teleworking IP client 34 according to the invention preferably includes a standard off the shelf PC so long as it is able to support IP based protocols (e.g., H.323, SIP, etc.) for voice and Multi Media data and signaling information data streams via an appropriate network interface (excluding IP only phone Client).

Figure 2:
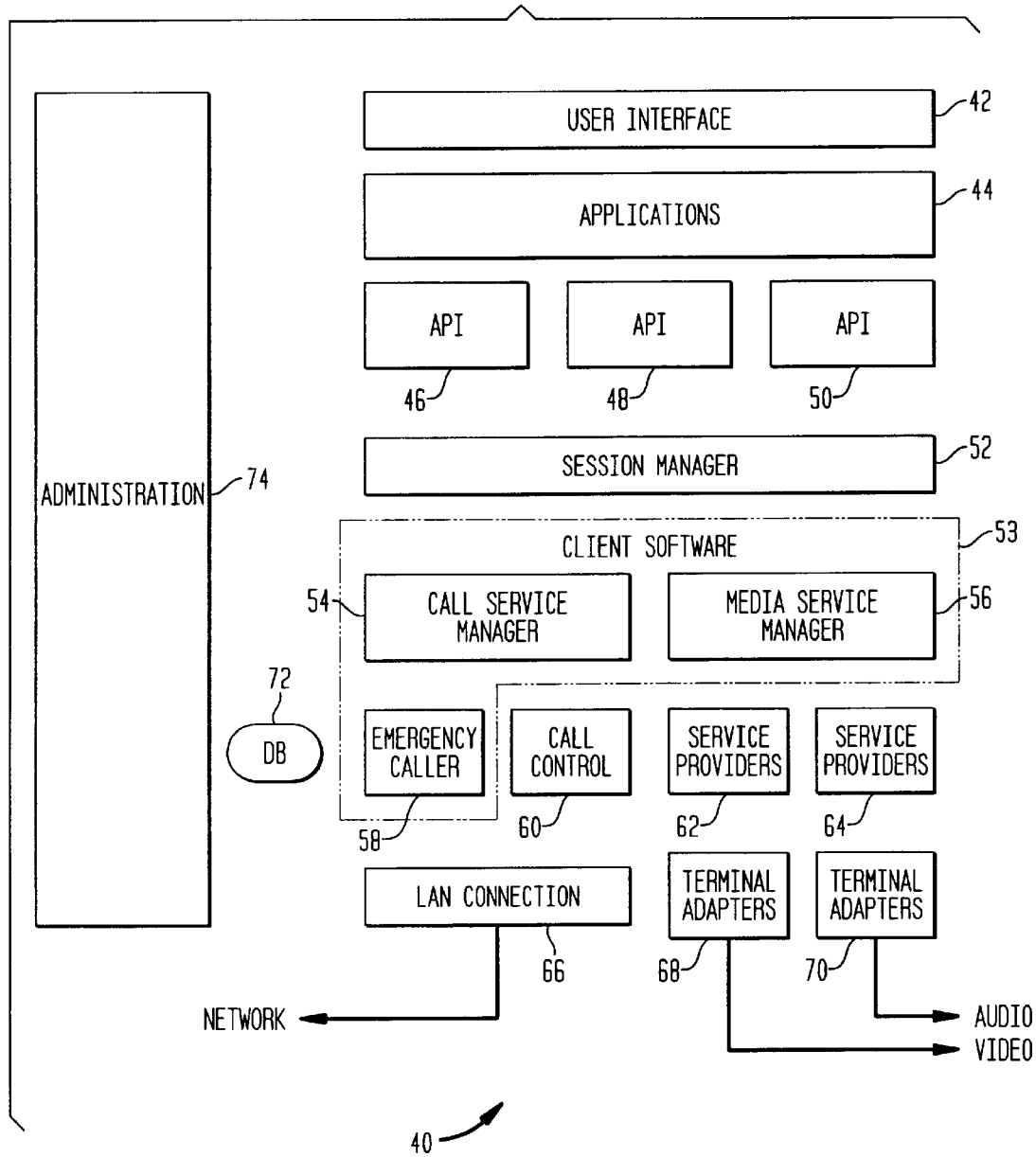
FIG. 2 is a high level block diagram of teleworking client software according to the invention.

Turning now to FIG. 2, an example of teleworking client software 40 according to the invention includes a user interface 42 through which a user gains access to applications 44. The applications 44 communicate with a session manager 52 via a plurality of application programming interfaces (APIs) 46, 48, 50. The session manager 52 communicates with the PSTN via the call service manager 54 and with the teleworking A/V hardware via the media service manager 56 (both shown included, along with emergency caller module 58, as part of client software 53 depicted in FIG. 3).

More particularly, the call service manager 54 communicates with the network via a call control module 60 through a LAN connection 66. According to the invention, an emergency caller module 58, described in more detail below with reference to FIG. 3, monitors network traffic for a defined sequence of dialed digits. The media service manager 56 communicates with various terminal adapters 68, 70 via service providers 62, 64.

According to the presently preferred embodiment, the emergency caller module 58 is associated with a database 72 of emergency numbers. The database 72 is provided with an administration interface 74 through which the teleworking user may enter/edit numbers that will be intercepted by the emergency caller module 58. According to an optional feature of the invention, the database and administration may be configured such that an intercepted number is associated with another number that will be dialed via the PSTN.

For example, if a teleworking user is connected to the PBX/MLTS via another PBX, e.g. in a hotel that provides a separate data connection, which requires that the user dial a digit, e.g. 9, to be connected to an outside line, the software can be programmed to insert the extra digit before dialing the emergency number. According to a further preferred embodiment, the emergency caller module 58 monitors dialed digits when a teleworking session is active and a new call has been placed.

Figure 3:
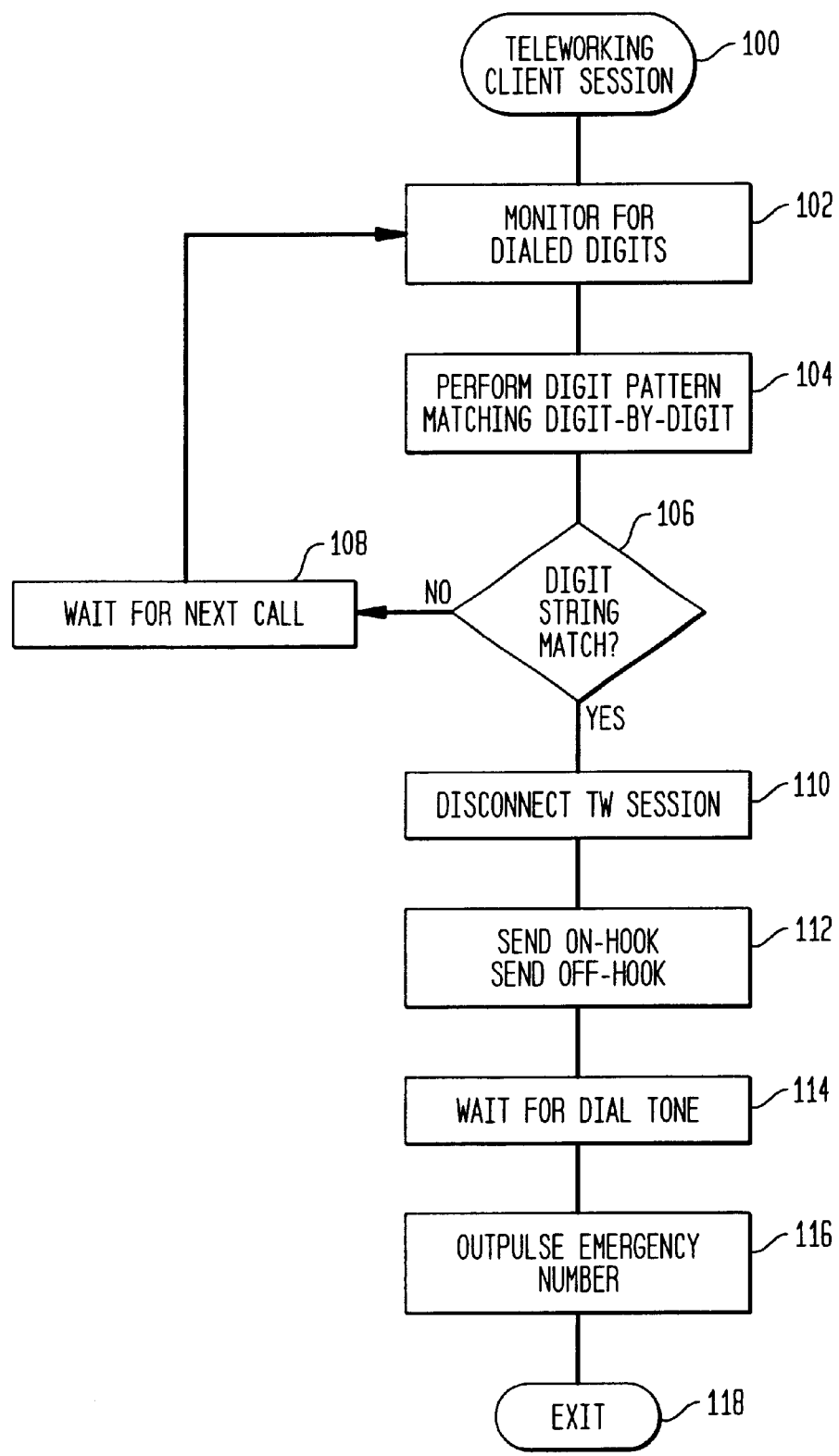
FIG. 3 is a simplified flow chart illustrating the methods of the invention.

FIG. 3 depicts the high-level processing of the invention that begins when the teleworking client has logged on and has an active session as illustrated at 100. Monitoring for digits dialed by the teleworking client user begins at 102. When a dialed digit is detected, a digit pattern matching function is performed at 104. If it is determined at 106, that the digits do not match a number in the database of emergency numbers, the software returns at 108 to monitor digits for the next call.

According to the presently preferred embodiment, the first digit is compared to the first digit of the associated pre-defined database of emergency numbers. If no match is found, the search is ended with no match. If a match is found, the second digit is collected and compared to the second digit of the associated pre-defined table of emergency numbers for those numbers which matched on the first digit. If no match is found, the search is ended with no match. If a match was found, the third digit is collected and compared to the third digit of the associated pre-defined table of emergency numbers for those numbers which matched on the first and second digit.

This process continues until either no match is determined or the digit string match is found at 106. Though not shown in FIG. 3, when a match is found, the database entry corresponding to the dialed emergency number is remembered for use in dialing over the PSTN.

If a match is found, the teleworking session is immediately disconnected at 110 (i.e., logged off, link dropped). An on-hook event is sent to the public network followed by an off-hook event at 112. When dial tone is received (i.e., from public network) at 114, the indicated number in the database (plus any programmed prefix) is automatically "outpulsed" on behalf of the teleworking user at 116. The emergency call monitoring is then stopped at 118. A normal public network call is in progress (i.e., no teleworking session). It is routed correctly to the proper PSAP with the correct call information (i.e., calling directory number).

There have been described and illustrated herein methods and apparatus for dialing an emergency number from a client coupled to a remote network via the PSTN. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A method for dialing an emergency number from a client coupled to a remote network via the PSTN, said client including a dialable telephone and said remote network including a remote PBX/MLTS through which said dialable telephone makes phone calls when connected to said PBX/MLTS via the PSTN, said method comprising the steps of:
    a) monitoring the network connection for the presence of dialed digits from the dialable telephone;
    b) comparing the dialed digits to a predefined sequence of tones corresponding to the emergency number;
    c) disconnecting the client from the remote network;
    d) coupling the client to the PSTN; and
    e) dialing the emergency number.

2. The method according to claim 1 wherein the emergency number dialed is different from the number represented by the dialed digits detected.

3. The method according to claim 1 further comprising the step of prior to dialing the emergency number, dialing an access number.

4. The method according to claim 1 further comprising the step of maintaining a database of emergency numbers associated with incoming dialed digits, wherein said step of comparing includes comparing the dialed digits to all the dialed digits of the emergency numbers in the database.

5. The method according to claim 1 wherein said step of disconnecting includes sending an on-hook signal.

6. The method according to claim 5 wherein said step of coupling includes sending an off-hook signal.

7. The method according to claim 1 wherein said step of comparing includes individually comparing each dialed digit to a sequence of tones corresponding to the emergency number.

8. A method for dialing an emergency number from a client coupled to a remote network via the PSTN, said remote network including a remote PBX/MLTS responsive to messages from the client representing dialed digits, said method comprising the steps of:
    a) monitoring the network connection for the presence of messages from the client representing dialed digits;
    b) comparing the dialed digits represented by said messages to a predefined sequence of tones corresponding to the emergency number;
    c) disconnecting the client from the remote network;
    d) coupling the client to the PSTN; and
    e) dialing the emergency number.

9. A method for dialing an emergency number from a teleworking client coupled to a remote teleworking server during a teleworking session via the PSTN, said remote teleworking server including a remote PBX/MLTS responsive to dialed digits from said teleworking client, said method comprising the steps of:
    a) monitoring the teleworking session for the presence of dialed digits;
    b) comparing the dialed digits to a predefined sequence of tones corresponding to the emergency number;
    c) terminating the teleworking session;
    d) disconnecting the teleworking client from the PSTN;
    e) reconnecting the client to the PSTN; and
    f) dialing the emergency number.

10. The method according to claim 9 wherein the emergency number signalled to the Central Office is different from the number represented by the dialed digits detected.

11. The method according to claim 9 further comprising the step of prior to dialing the emergency number, dialing an access number.

12. The method according to claim 9 further comprising the step of maintaining a database of emergency numbers associated with dialed digits, wherein said step of comparing includes comparing the dialed digits to all the stored digits of the emergency numbers in the database.

13. The method according to claim 9 wherein said step of disconnecting includes sending an on-hook signal.

14. The method according to claim 13 wherein said step of coupling includes sending an off-hook signal.

15. The method according to claim 9 wherein said step of comparing includes individually comparing each dialed digit to a sequence of digits corresponding to the emergency number(s).

16. An apparatus for dialing an emergency number from a client coupled to a remote network via the PSTN, said remote network including a remote PBX/MLTS responsive to dialed digits from said client, said apparatus comprising:
- a) monitoring means for monitoring the network connection for the presence of dialed digits;
- b) comparison means coupled to said monitoring means for comparing the dialed digits to a predefined sequence of digits corresponding to the emergency number;
- c) connection means coupled to said comparison means for disconnecting the client from the remote network and coupling the client to the PSTN; and
- d) a dialer coupled to the PSTN and to said comparison means for dialing the emergency number.

17. The apparatus according to claim 16 wherein the emergency number dialed is different from the number represented by the dialed digits tones detected.

18. The apparatus according to claim 16 wherein said dialer includes means for dialing an access number prior to dialing the emergency number.

19. The apparatus according to claim 16 further comprising database means for maintaining a database of emergency numbers comprised of digits, allowing said database means being coupled to said comparison means.

20. The apparatus according to claim 16 wherein said connection means includes means for sending an on-hook signal.

21. The apparatus according to claim 20 wherein said connection means includes means for sending an off-hook signal.

22. The apparatus according to claim 16 wherein said comparison means includes means for individually comparing each dialed digit to a sequence of digits corresponding to the emergency number.

23. An apparatus for dialing an emergency number from a teleworking client coupled to a remote teleworking server during a teleworking session via the PSTN, said teleworking client including a dialable telephone and said remote teleworking server including a remote PBX/MLTS responsive to dialed digits from said dialable telephone, said method comprising:
- a) monitoring means for monitoring the teleworking session for the presence of dialed digits from said teleworking client;
- b) comparison means coupled to said monitoring means for comparing the dialed digits to a predefined sequence of digits corresponding to the emergency number;
- c) session terminating means coupled to said comparison means for terminating the teleworking session;
- d) connection means coupled to said session terminating means for disconnecting the teleworking client from the PSTN and for reconnecting the client to the PSTN; and
- e) a dialer coupled to said connection means for dialing the emergency number.

24. The apparatus according to claim 23 wherein the emergency number dialed is different from the number represented by the dialed digits detected.

25. The apparatus according to claim 23 wherein said dialer includes means for dialing an access number prior to dialing the emergency number.

26. The apparatus according to claim 23 further comprising database means coupled to said comparison means for maintaining a database of emergency numbers associated with dialed digits.

27. The apparatus according to claim 23 wherein said connection means includes means for sending an on-hook signal.

28. The apparatus according to claim 27 wherein said connection means includes means for sending an off-hook signal.

29. The apparatus according to claim 23 wherein said comparison means includes means for individually comparing each dialed digit to a sequence of digits corresponding to the emergency number.

30. In a teleworking client apparatus adapted to be coupled to a remote PBX/MLTS via the PSTN such that calls made from the teleworking client apparatus are routed through the remote PBX/MLTS, the improvement comprising:
- a) determining means coupled to the teleworking client for determining when an emergency number is dialed by the teleworking client;
- b) disconnecting means coupled to the teleworking client and the PSTN for disconnecting the teleworking client from the PSTN such that the teleworking client is disconnected from the remote PBX/MLTS;
- c) connecting means coupled to the teleworking client and the PSTN for reconnecting the teleworking client to the PSTN; and
- d) dialing means coupled to the PSTN for dialing the emergency number after the teleworking client is reconnected to the PSTN.

31. A method for routing an emergency call from a teleworking client coupled to a remote PBX/MLTS via the PSTN such that calls made from the teleworking client are normally routed through the remote PBX/MLTS, said method comprising:
- a) detecting when an emergency number is dialed by the teleworking client;
- b) disconnecting the teleworking client from the remote PBX/MLTS;
- c) dialing the emergency number via the PSTN without routing through the remote PBX/MLTS.

* * * * *